(12) United States Patent
Pacicrek et al.

(10) Patent No.: US 6,433,476 B1
(45) Date of Patent: Aug. 13, 2002

(54) EL LAMP WITH HEATER ELECTRODE

(75) Inventors: Walter J. Pacicrek, Phoenix; William A. Coghlan; Christopher C. Shol, both of Tempe, all of AZ (US)

(73) Assignee: Durel Corporation, Chandler, AZ (US)

( * ) Notice: Subject to any disclaimer, the term of this patent is extended or adjusted under 35 U.S.C. 154(b) by 0 days.

(21) Appl. No.: 09/689,331

(22) Filed: Oct. 12, 2000

(51) Int. Cl.[7] .............................. G02F 1/13; G02F 1/133
(52) U.S. Cl. ..................... 313/509; 313/506; 349/69
(58) Field of Search ................................ 313/498, 506, 313/509; 315/169.3, 169.4; 359/44, 48, 50, 62, 86, 87; 428/917; 349/69

(56) References Cited

U.S. PATENT DOCUMENTS

| | | | |
|---|---|---|---|
| 4,500,173 A | 2/1985 | Leibowitz et al. | 350/345 |
| 4,580,877 A * | 4/1986 | Washo | 349/69 |
| 4,880,475 A | 11/1989 | Lindmayer | 427/69 |
| 4,967,117 A * | 10/1990 | Yoshioka et al. | 349/69 |
| 5,121,234 A | 6/1992 | Kucera | 359/50 |
| 5,559,614 A | 9/1996 | Urbish et al. | 359/44 |
| 6,188,175 B1 * | 2/2001 | May et al. | 313/506 X |
| 6,208,076 B1 * | 3/2001 | Arai et al. | 313/506 X |

* cited by examiner

Primary Examiner—Ashok Patel
(74) Attorney, Agent, or Firm—Paul F. Wille

(57) ABSTRACT

An electroluminescent lamp includes two electrodes and at least three connectors, a first connector coupled to a first electrode and a second connector and a third connector coupled to the second electrode. A first electric current flows through the lamp between the first connector and the second connector, causing the lamp to emit light. A second electric current flows through the second electrode between the second connector and the third connector, whereby the second electrode increases in temperature in response to the second electric current. When backlighting a liquid crystal display, the second electrode provides heat to warm the display for proper operation. Either electrode can be used as a heater.

12 Claims, 2 Drawing Sheets

EL LAMP WITH HEATER ELECTRODE

BACKGROUND OF THE INVENTION

This invention relates to electroluminescent (EL) lamps and, in particular, to an EL lamp having a heater element as one electrode As used herein, an EL "panel" is a single substrate including one or more luminous areas, wherein each luminous area is an EL "lamp." One or more lamps in a panel can include a heater as an electrode.

An EL lamp is essentially a capacitor having a dielectric layer between two conductive electrodes, one of which is transparent. The dielectric layer includes a phosphor powder or there is a separate layer of phosphor powder adjacent the dielectric layer. The phosphor powder emits light in the presence of a strong electric field, using very little current.

A modern EL lamp is a thick film device, typically including a transparent substrate of polyester or polycarbonate material having a thickness of about 7.0 mils (0.178 mm.). A transparent, front electrode of indium tin oxide (ITO) or indium oxide is vacuum deposited onto the substrate to a thickness of 1000 Å or so. A phosphor layer is screen printed over the front electrode and a dielectric layer is screen printed over phosphor layer. A rear electrode is screen printed over the dielectric layer. Other methods for making an EL lamp can be used instead, e.g. roll coating.

The inks used for making an EL lamp include a binder, a solvent, and a filler, wherein the filler determines the nature of the printed layer. A typical solvent is dimethylacetimide (DMAC) or ethylbutylacetate (EB acetate). The binder is typically a fluoropolymer such as polyvinylidene fluoride/hexafluoropropylene (PVDF/HFP), polyester, vinyl, or epoxy. A phosphor layer is typically deposited from a slurry containing a solvent, a binder, and zinc sulphide particles. A dielectric layer is typically deposited from a slurry containing a solvent, a binder, and barium titanate ($BaTiO_3$) particles. A rear (opaque) electrode is typically deposited from a slurry containing a solvent, a binder, and conductive particles such as silver or carbon. Because the solvent and binder for each layer are chemically the same or similar, there is chemical compatibility and good adhesion between adjoining layers.

In many applications, e.g. automotive displays and portable devices such as wrist watches, radios, global positioning systems, and compact disk players, an EL lamp is used for backlighting a liquid crystal display (LCD); e.g., as disclosed in U.S. Pat. No. 4,580,877 (Washo) and U.S. Pat. No. 5,121,234 (Kucera). The combination is popular because of the uniformity of the back lighting and the resolution and contrast of the LCD. There is a problem in that the liquid crystal material becomes too viscous for proper operation at low temperatures, e.g., below 0° C. It is known to provide a heaters for an LCD but a heater often increases the bulk of the display, which is undesirable. Also, heaters typically apply heat nonuniformly to the display.

It is known in the art to vary the resistivity of an ITO layer by changing thickness As disclosed in U.S. Pat. No. 4,880,475 (Lindmayer), relating to a thin film (glass substrate) electroluminescent device; an ultra-thin, high resistivity ITO layer is protected by another metal oxide layer, such as nickel oxide.

It is also known in the art to use an ITO layer as a heater in an LCD. As disclosed in U.S. Pat. No. 5,559,614 (Urbish et al.), the heater electrode is coplanar with but separate from the rear electrode in the LCD. The heater electrode is disclosed as a combination of ITO and a copper oxide layer. Connections to the heater are only described generically but at least two additional connectors are required for the heater. More than two additional connections are likely required for a patterned heater electrode.

It is also known in the art for an LCD and an EL lamp to share a common electrode, e.g. as disclosed in U.S. Pat. No. 4,500,173 (Leibowitz et al.), but it is not known that the common electrode be a heater.

In view of the foregoing, it is therefore an object of the invention to provide an EL lamp with a heater electrode.

Another object of the invention is to provide an EL lamp wherein the front electrode and the heater electrode are the same electrode.

A further object of the invention is to provide an EL lamp wherein the rear electrode and the heater electrode are the same electrode.

Another object of the invention is to provide an EL lamp with an integral heater requiring a single, additional connector.

A further object of the invention is to provide a liquid crystal display with an EL lamp for backlighting and for heating the liquid crystal display.

Another object of the invention is to provide a liquid crystal display backlit by an EL lamp having a transparent, heating, front electrode.

A further object of the invention is to provide a liquid crystal display with a heater covering the entire area of the display.

SUMMARY OF THE INVENTION

The foregoing objects are achieved in this invention wherein an electroluminescent lamp includes two electrodes and at least three connectors, a first connector coupled to a first electrode and a second connector and a third connector coupled to the second electrode. A first electric current flows through the lamp between the first connector and the second connector, causing the lamp to emit light. A second electric current flows through the second electrode between the second connector and the third connector, whereby the second electrode increases in temperature in response to the second electric current. When backlighting a liquid crystal display, the second electrode provides heat to warm the display for proper operation. Either electrode can be used as a heater.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
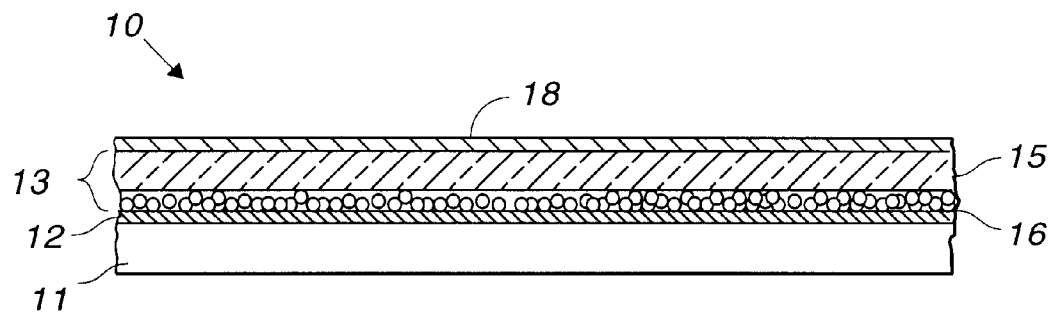
FIG. 1 is a cross-section of an electroluminescent lamp.

FIG. 1 is a cross-section of an EL lamp. In none of the cross-sections are the several layers shown in proportion or to scale. Lamp 10 includes transparent substrate 11 of polyester or polycarbonate material. Transparent electrode 12 overlies substrate 11 and includes indium tin oxide or indium oxide. Phosphor layer 16 overlies electrode 12 and dielectric layer 15 overlies the phosphor layer. The phosphor layer and the dielectric layer can be combined into a single layer, as indicated by reference number 13. Overlying dielectric layer 15 is rear electrode 18 containing conductive particles such as silver or carbon in a resin binder.

During operation, an alternating current is applied to electrodes 12 and 18, causing a minute current to flow between the electrodes, through the lamp, causing the phosphor in layer 16 to emit light.

In accordance with the invention, a small current is applied to opposite edges of transparent electrode 12, causing current to flow across the electrode, orthogonal to the current through the lamp. The amount of current is determined by the resistivity of electrode 12 and the area of the lamp. A resistivity of approximately 50–500Ω per square is preferred. The applied voltage can be alternating or direct. In most applications, it is assumed that the applied heater voltage is 3–12 volts DC.

Figure 2:
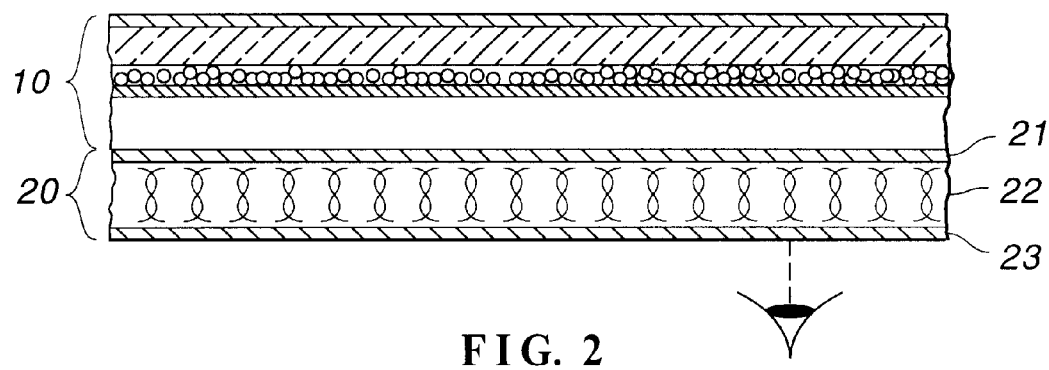
FIG. 2 is a cross-section of an electroluminescent lamp and a liquid crystal display constructed in accordance with a preferred embodiment of the invention.

FIG. 2 illustrates an EL lamp attached to a liquid crystal display for back-lighting the display. Lamp 10 is constructed as described above. Liquid crystal display 20 includes transparent electrode 21, liquid crystal material 22, and transparent electrode 23. Other layers, e.g. polarizing layers, are not shown but are well known in the art. Liquid crystal material is typically somewhat viscous and, at temperatures below 0° C., tends to gel. Liquid crystal displays operate by changing the alignment of the molecules of the material when an electric field is applied. At low temperatures, the viscosity of the material increases greatly and the material may not respond to an applied field. By providing a small amount of heat, the temperature of the liquid crystal material can be raised sufficiently for proper operation in cold temperatures. Displays, such as instrument panels in vehicles, tend to trap heat. Thus, little heat is necessary to raise the temperature sufficiently for the display to operate normally.

Figure 3:
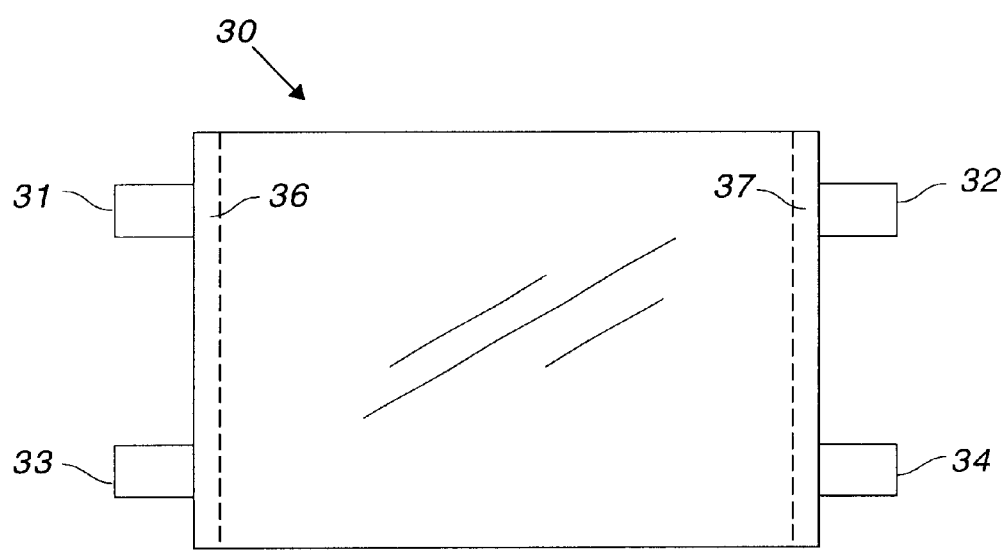
FIG. 3 is a plan view of an electroluminescent lamp constructed in accordance with the invention.

FIG. 3 is a plan view of an EL lamp constructed in accordance with the invention. EL lamp 30 includes connectors 31 and 32 for the front electrode and connectors 33 and 34 for the rear electrode. EL lamps typically have bus bars surrounding an electrode to provide a low resistance connection to the electrode. With a heater electrode, a bus bar completely around the perimeter of an electrode is not possible, unless a second connection is made at a part of the lamp hidden from a viewer. Bus bar 36 is located along one edge of EL lamp 30 and is electrically coupled to connector 31. Similarly, bus bar 37 is located along the opposite edge of the lamp and is electrically coupled to connector 32. Thus, a voltage coupled across connectors 31 and 32 will cause a current to flow across the front electrode, warming the electrode. The heating current can be alternating or direct.

Depending upon the power supply used, only a single, additional connector is needed. One of connectors 33 and 34 can be eliminated unless kept for reasons unrelated to the invention. A lamp constructed in accordance with the invention is compatible with a driver having either a single-ended output; i.e. a driver producing alternating current between an output terminal and ground, a half-bridge output, or a transformer output. If a driver has a full bridge output, (four switching elements), then a floating bias is necessary for the heater, e.g. the voltage is coupled across the front electrode by a transformer.

In the prior art, great efforts have been made to obtain a uniform output from an EL lamp. The voltage used to provide heat does not introduce a significant non-uniformity across the face of an EL lamp because the heater voltage is small relative to the peak-to-peak voltage used to drive the EL lamp; e.g. 3 volts vs. 120 volts.

Figure 4:
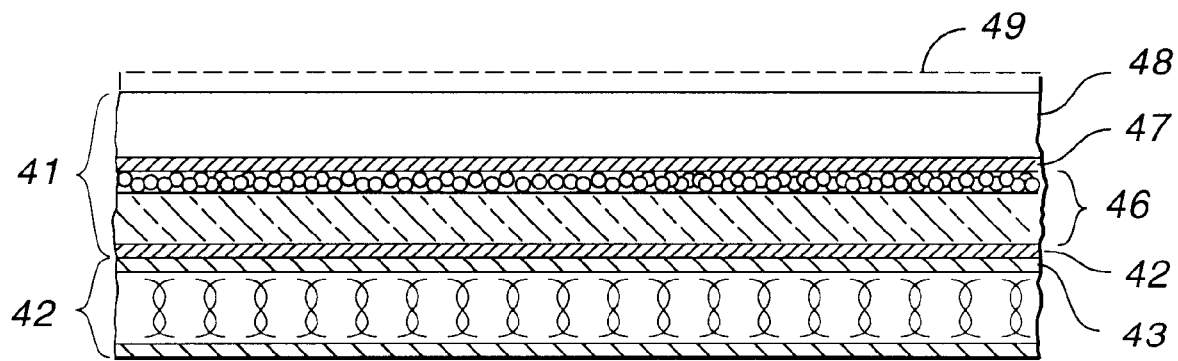
FIG. 4 is a cross-section of an electroluminescent lamp and a liquid crystal display constructed in accordance with an alternative embodiment of the invention.

FIG. 4 illustrates an alternative embodiment of the invention in which a transparent rear electrode is used for the EL lamp and the lamp is attached to a liquid crystal display by the rear electrode. This moves the phosphor layer closer to the liquid crystal display and provides a slightly more diffuse light source because the light is passing through the dielectric layer, as illustrated in FIG. 4. The dielectric layer and the phosphor layer can be combined.

In particular, lamp 41 includes transparent electrode 42 in contact with rear electrode 43 of liquid crystal display 44. Phosphor/dielectric layer 46 overlies electrode 42 and rear electrode 47 overlies layer 46. Substrate 48 overlies rear electrode 47. A reflective layer, such as layer 49, is optionally provided to redirect light toward a viewer. Electrode 42 is preferably the heater electrode for liquid crystal display 44.

Instead of being constructed on substrate 47, the lamp materials, i.e. layers 42, 46, and 47, can be deposited on a temporary substrate, e.g. by roll coating, and laminated to the rear electrode of liquid crystal display 44, thereby eliminating substrate 48. Electrodes 42 and 43 can be separated by a thin insulating layer, not shown, if it is desired to pattern either electrode. An adhesive layer can serve as both an adhesive and as an insulator.

Figure 5:
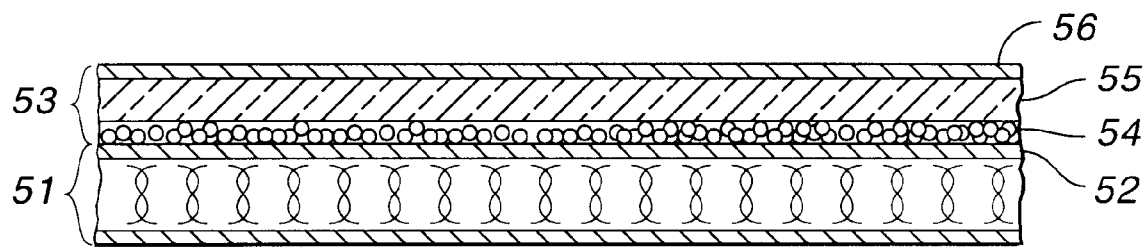
FIG. 5 is a cross-section of an electroluminescent lamp and a liquid crystal display constructed in accordance with an alternative embodiment of the invention.

FIG. 5 illustrates an alternative embodiment of the invention in which an electrode is shared with a liquid crystal display. Liquid crystal display 51 includes transparent conductive layer 52 that is both the rear electrode of the liquid crystal display and the front electrode of EL lamp 53. Phosphor layer 54 overlies layer 52 and dielectric layer 55 overlies the phosphor layer. Rear electrode 56 can be deposited from a conductive ink or can be a layer of metal foil, such as aluminum, which would also provide a reflective function. Layer 52 is preferably the heater layer.

EL lamp 53 is preferably made by depositing the lamp materials, in reverse order, either on a metal foil, which then becomes the rear electrode, or on a temporary substrate, starting with layer 56. The materials are then laminated to the rear of liquid crystal display 51 and the temporary substrate, if present, is removed.

The invention thus provides an EL lamp having a heater electrode as either the front electrode, the rear electrode, or both electrodes. The lamp requires a minimum of a single, additional connector for the heater. Combined with a liquid crystal display, the invention provides an EL lamp for backlighting and for heating the liquid crystal display.

Having thus described the invention, it will be apparent to those of skill in the art that many modifications can be made with the scope of the invention. For example, the rear electrode of lamp 30 can be a heater electrode, if desired, as an alternative to the front electrode or in addition to the front electrode. The heater electrode can be patterned and still serve as both a front, or rear, electrode and a heater electrode. A bimetallic switch, or other apparatus, can be added near the display for sensing when the display has warmed sufficiently and opening the heater circuit when warm.

What is claimed as the invention is:

1. In a display including an electroluminescent lamp having a transparent layer of metal oxide and at least one connector coupled to said transparent layer for coupling a first electric current into said lamp, the improvement comprising:

a second connector coupled to said transparent layer for conducting a second electric current across said transparent layer, whereby said transparent layer increases in temperature in response to said second electric current.

2. The display as set forth in claim 1 wherein said transparent layer has a resistivity of approximately 50–500Ω/square.

3. The display as set forth in claim 1 wherein said transparent layer has at least two opposed edges and said one connector is coupled to a first of said is opposed edges and said second connector is coupled to a second of said opposed edges.

4. The display as set forth in claim 1 and further including a liquid crystal display overlying at least a portion of said electroluminescent lamp.

5. The display as set forth in claim 1 and further including a liquid crystal display, wherein the liquid crystal display includes a transparent, metal oxide layer.

6. The display as set forth in claim 5 wherein the electroluminescent lamp and the liquid crystal display share a common layer of metal oxide.

7. The display as set forth in claim 1 and further including a liquid crystal display having a rear, conductive layer wherein the transparent layer of said electroluminescent lamp overlies said rear, conductive layer.

8. The display as set forth in claim 7 wherein said transparent layer is the front electrode of said electroluminescent lamp.

9. The display as set forth in claim 7 wherein said transparent layer is the rear electrode of said electroluminescent lamp.

10. A display comprising:
   a first electrode;
   a phosphor layer overlying said first electrode;
   a dielectric layer overlying said phosphor layer;
   a second electrode overlying said dielectric layer;
   a first connector electrically coupled to one of said first and second electrodes;
   a second connector electrically coupled to said one of said first and second electrodes;
   wherein said first and second electrodes couple a first electric current through said phosphor layer and said dielectric layer for causing the phosphor layer to emit light; and
   wherein said first and second connectors couple a second electric current through said one electrode for causing said one electrode to increase in temperature.

11. A display as set forth in claim 10 and further including a liquid crystal display warmed by said one of said first and second electrodes when said second electric current flows.

12. A display as set forth in claim 11 wherein one of said first and second electrodes is shared in common with said liquid crystal display.

\* \* \* \* \*

UNITED STATES PATENT AND TRADEMARK OFFICE
CERTIFICATE OF CORRECTION

PATENT NO.    : 6,433,476 B1
DATED         : August 13, 2002
INVENTOR(S)   : Paciorek et al.

It is certified that error appears in the above-identified patent and that said Letters Patent is hereby corrected as shown below:

<u>Title page,</u>
Item [75], Inventors, the first named Inventor should read -- Paciorek --.

Signed and Sealed this

Thirtieth Day of September, 2003

JAMES E. ROGAN
*Director of the United States Patent and Trademark Office*